US011017498B2

(12) United States Patent
Staar et al.

(10) Patent No.: US 11,017,498 B2
(45) Date of Patent: May 25, 2021

(54) GROUND TRUTH GENERATION FROM SCANNED DOCUMENTS

(71) Applicant: International Business Machines Corporation, Armonk, NY (US)

(72) Inventors: Peter Willem Jan Staar, Wädenswil (CH); Michele Dolfi, Zurich (CH); Christoph Auer, Zurich (CH); Leonidas Georgopoulos, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/354,123

(22) Filed: Mar. 14, 2019

(65) Prior Publication Data
US 2020/0294187 A1 Sep. 17, 2020

(51) Int. Cl.
*G06T 3/00* (2006.01)
*G06K 19/06* (2006.01)
*G06K 9/20* (2006.01)

(52) U.S. Cl.
CPC .......... *G06T 3/0075* (2013.01); *G06K 9/2063* (2013.01); *G06K 19/06037* (2013.01)

(58) Field of Classification Search
CPC ............ G06T 3/0075; G06K 19/06037; G06K 9/2063; G06K 2009/3225; G06K 9/00449; G06K 9/6256; G06K 9/3216
See application file for complete search history.

(56) References Cited

U.S. PATENT DOCUMENTS

| 7,515,305 | B2* | 4/2009 | Mizes ................... B41J 29/393 358/3.06 |
| 7,583,282 | B2* | 9/2009 | Yamauchi .......... G03G 15/5062 347/229 |
| 8,755,595 | B1 | 6/2014 | Bissacco et al. |

(Continued)

OTHER PUBLICATIONS

Thomas Strecker et al, Automated Ground Truth Data Generation for Newspaper Document Images, 2009 10th International Conference on Document Analysis and Recognition, (ICDAR '09), 5 pages https://ieeexplore.ieee.org/document/5277685/.

(Continued)

*Primary Examiner* — Wesley J Tucker
(74) *Attorney, Agent, or Firm* — Daniel Morris; Otterstedt, Wallace & Kammer, LLP (57) ABSTRACT

A plurality of electronic documents comprising one or more document pages are received. First position markers, second position markers and page identifiers are inserted to the pages. The plurality of electronic documents are printed, thereby generating a printed corpus comprising a plurality of printed documents. The plurality of printed documents are scanned, thereby generating a scanned corpus comprising a plurality of scanned images. Scanning frame positions of the first and the second position markers are detected and the detected scanning frame positions and the page positions are used to define affine transformations between the plurality of scanned images and the corresponding document pages. The affine transformations are applied to the plurality of scanned images to align the plurality of scanned images with the corresponding document pages of the plurality of electronic documents.

16 Claims, 7 Drawing Sheets

(56) References Cited

U.S. PATENT DOCUMENTS

| | | | | |
|---|---|---|---|---|
| 9,571,684 | B1* | 2/2017 | Phelps | H04N 1/10 |
| 2003/0128401 | A1* | 7/2003 | Conrow | H04N 1/00002 |
| | | | | 358/300 |
| 2013/0163055 | A1* | 6/2013 | Herloski | G03G 15/5062 |
| | | | | 358/474 |
| 2014/0063099 | A1* | 3/2014 | Enge | B41J 2/155 |
| | | | | 347/14 |
| 2014/0210947 | A1* | 7/2014 | Finn | G06T 7/50 |
| | | | | 348/46 |
| 2015/0210099 | A1* | 7/2015 | Barron | B41J 11/46 |
| | | | | 347/10 |
| 2016/0072968 | A1 | 3/2016 | Nakamura | |
| 2017/0004374 | A1 | 1/2017 | Osindero | |
| 2019/0158682 | A1* | 5/2019 | Andersen | H04N 1/00068 |
| 2020/0019575 | A1* | 1/2020 | Farrell | G06F 16/955 |

OTHER PUBLICATIONS

Joost van Beusekom et al, Automated OCR Ground Truth Generation, The Eighth IAPR International Workshop on Document Analysis Systems (DAS), 2008, 7 pages http://doi.ieeecomputersociety.org/10.1109/DAS.2008.59.

Tapas Kanungo et al, An Atomatic Closed-loop Methodology for Generating Character Groundtruth for Scanned Documents, IEEE Transactions on Pattern Analysis and Machine Intelligence, vol. 21, No. 2, 1999, pp. 179-183 https://ieeexplore.ieee.org/document/748827/.

* cited by examiner

GROUND TRUTH GENERATION FROM SCANNED DOCUMENTS

BACKGROUND

The present invention relates to a computer-implemented method for ground-truth generation of scanned images.

The present invention further relates to a corresponding system and a corresponding computer program product.

The extraction of fundamental components in a scanned document, e.g. text-lines, paragraphs, lines etc. may be done in two fundamentally different ways. Either one uses a rule-based method, in which one encodes explicitly certain properties of these components and uses those for their identification and extraction. Another more popular way is to use a machine learning approach, in which one uses data to learn those properties implicitly. This approach is more general, but typically requires lots of annotated data which is hard and costly to obtain. Such annotated data is often referred to as ground-truth.

Accordingly, there is a need for methods which facilitate to gather such ground-truth in an efficient way.

SUMMARY

According to a first aspect, the invention is embodied as a computer-implemented method for ground-truth generation of scanned images. The method comprises a step of receiving a plurality of electronic documents, wherein the plurality of electronic documents each comprise one or more document pages. The method comprises further steps of inserting first position markers at first positions of the one or more document pages of the plurality of electronic documents, inserting second position markers at second positions of the one or more document pages of the plurality of electronic documents and inserting page identifiers to the one or more document pages of the plurality of electronic documents. The first position markers and the second position markers indicate page position information of the respective page position of the first and the second position markers on the one or more document pages. A further step of the method comprises printing the plurality of electronic documents including the first position markers, the second position markers and the page identifiers, thereby generating a printed corpus comprising a plurality of printed documents. Another step of the method comprises scanning the plurality of printed documents including the first positions markers, the second position markers and the page identifiers, thereby generating a scanned corpus comprising a plurality of scanned images. Further steps of the method include detecting scanning frame positions of the first and the second position markers on the plurality of scanned images and using the detected scanning frame positions of the first and the second position markers and the page positions of the first and the second position markers to define affine transformations between the plurality of scanned images and the corresponding document pages of the plurality of electronic documents. The scanning frame positions are the positions of the first and the second position markers with respect to the scanning frame of the plurality of scanned images. Another step comprise applying the affine transformations to the plurality of scanned images to align the plurality of scanned images with the corresponding document pages of the plurality of electronic documents.

According to another aspect, the invention is embodied as a system for performing a computer-implemented method for ground-truth generation of scanned images. The system comprises a server, a scanning machine and a network. The system is configured to perform a computer-implemented method according to the first aspect. More particularly, system is configured to receive, by the server, a plurality of electronic documents comprising one or more document pages and to insert, by the server, first position markers at first positions of the one or more document pages and second position markers at second positions of the one or more document pages. The first position markers and the second position markers indicate page position information of the respective page position of the first and the second position markers on the one or more document pages. The system is further configured to insert, by the server, page identifiers to the one or more document pages of the plurality of electronic documents. The system is further configured to print, by the scanning machine, the plurality of electronic documents including the first position markers, the second position markers and the page identifiers, thereby generating a printed corpus comprising a plurality of printed documents and to scan, scan, by the scanning machine, the plurality of printed documents including the first positions markers, the second position markers and the page identifiers, thereby generating a scanned corpus comprising a plurality of scanned images, In addition, the system is configured to detect, by the server, scanning frame positions of the first and the second position markers on the plurality of scanned images. The scanning frame positions are the positions of the first and the second position markers with respect to the scanning frame of the plurality of scanned images. The system is further configured to use, by the server, the detected scanning frame positions of the first and the second position markers and the page positions of the first and the second position markers to compute affine transformations between the plurality of scanned images and the corresponding document pages of the plurality of electronic documents and to apply by the server, the affine transformations to the plurality of scanned images to align the plurality of scanned images with the corresponding document pages of the plurality of electronic documents.

According to yet another aspect of the invention a computer program product for ground-truth generation of scanned images by a system comprising a scanning machine, a server, and a network is provided. The computer program product comprises a computer readable storage medium having program instructions embodied therewith. The program instructions are executable by the system to cause the system to perform a method according to the first aspect.

Embodiments of the invention will be described in more detail below, by way of illustrative and non-limiting examples, with reference to the accompanying drawings.

DETAILED DESCRIPTION

In reference to FIGS. 1-6, some general aspects and terms of embodiments of the invention are described.

Embodiments of the invention consider that there are generally two fundamentally different types of documents. On the one hand, there are programmatic documents, in which the fundamental components are represented by code. Such programmatic documents include e.g. documents in the Portable Document Format (PDF) or in Microsoft-Word format. A programmatic document may be generally defined as a document which is of the nature of or according to a program, schedule, or method.

On the other hand, there are scanned documents, where the fundamental components are represented by colored pixels in an image. This includes e.g. documents in Portable Networks Graphic (png), Joint Photographics Expert Group (JPEG) or Tagged Image File Format (TIFF) format.

While it is rather easy to transfer any programmatic document into a scanned form, the opposite is not true. For the latter, one needs either carefully tuned rule base algorithms or machine learning algorithms. The latter need lots of ground-truth.

Embodiments of the invention provide a computer-implemented method to generate such ground-truth in an efficient way.

Embodiments of the invention are based on the application of a print-scan protocol starting from programmatic documents using real, i.e. physical scanning machines, with real defects. Such programmatic documents may in the following also be denoted as electronic documents.

This is advantageously a realistic approach, since it is using real devices which introduce real noise into the scanned documents.

However, one of these noise factors is the misalignment of the scanned document/image compared to the original programmatic document. As an example, the coordinates of the bounding boxes of e.g. the text are not matching the original ones. The misalignment may comprise in particular a movement, rotation and/or a rescaling.

Embodiments of the invention use position markers which are printed e.g. as small QR codes, to find the correct affinity transformation to align the scanned image with the original electronic document. In this way, the affinity transformations may be computed in an efficient way as the position markers allow to compute the affinity transformation without doing a match on the full image. Hence methods and systems according to embodiments of the invention may speed up the generation of real-world ground-truth of scanned documents.

The term ground truth may generally refer to information provided by direct observation (i.e. empirical evidence) as opposed to information provided by inference. In the field of image analysis it may refer in particular to the correct identity, position, size and coordinates of the individual symbols, e.g. the characters, as well as of words, paragraphs titles and other layout information.

Figure 1:
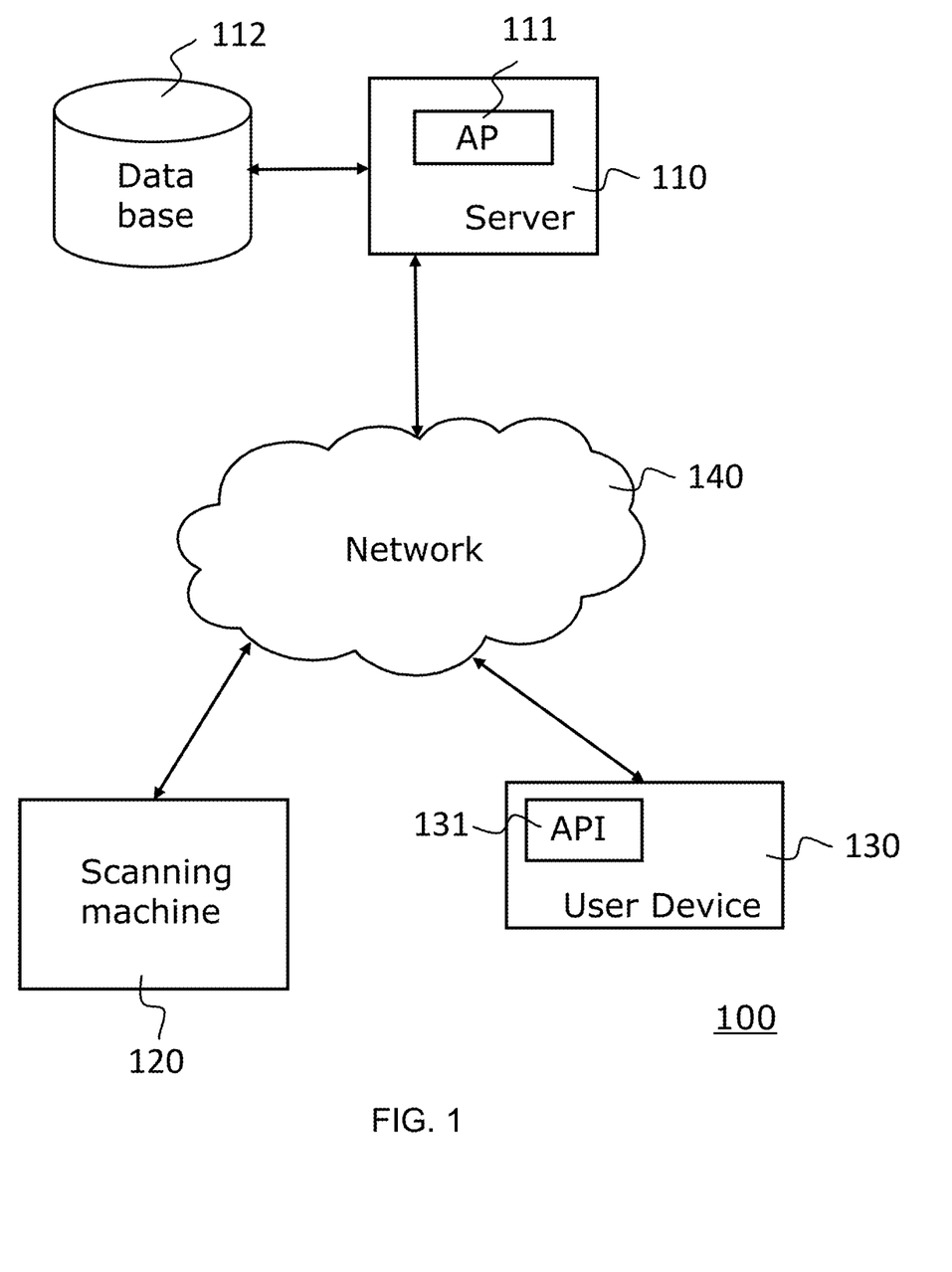
FIG. 1 shows a schematic block diagram of system according to an embodiment of the invention.

FIG. 1 shows an exemplary block diagram of a system 100 for performing a computer-implemented method for ground-truth generation of scanned images according to an embodiment of the invention.

The system comprises a server 110 which is configured to run an application program 111 for performing a computer-implemented method for ground-truth generation of scanned images. The server 110 is coupled with a database 112. The database 112 may store in particular a plurality of electronic documents that may be used as original documents or in other words starting documents for the ground truth generation. The electronic documents are in particular embodied as programmatic documents. The system 100 further comprises a scanning machine 120. The scanning machine 120 may provide scanning as well as printing functionality. Hence the scanning machine 120 may also be denoted as scanning/printing machine. The system 100 further comprises a user device 130. The user device 130 may comprise a display and user input means such as a keyboard to provide a user interface to a user of the system 100. The user device 130 may comprise in particular an application programming interface (API) 131 that is adapted to provide an interface to the application program 111 running on the server 110.

The server 110, the scanning machine 120 and the user device 130 are coupled to a network 140 and may communicate with each other via the network 140. The network 140 may be embodied as a local area network (LAN), a general wide area network (WAN) and/or a public network (e.g., the Internet).

Figure 2A:
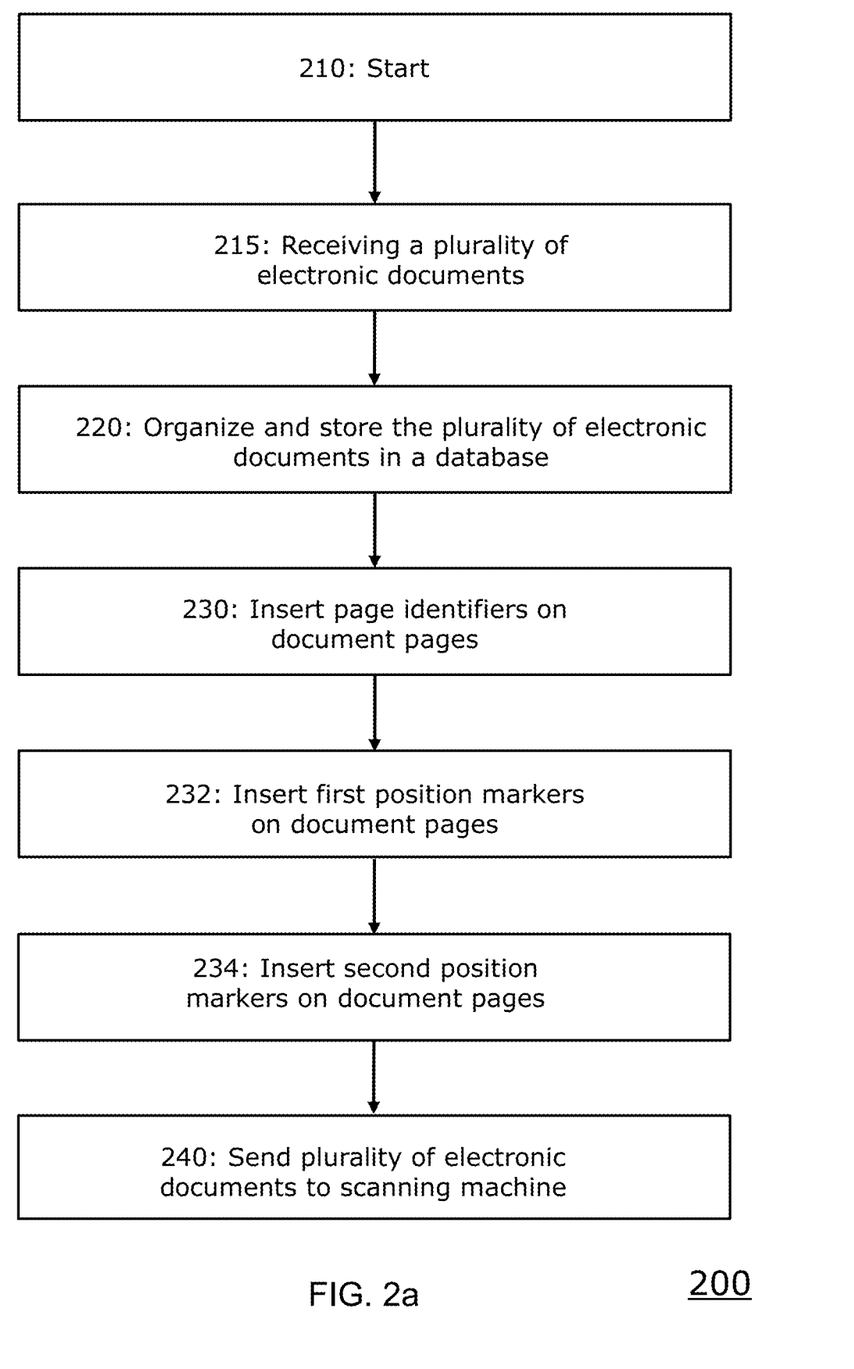
FIG. 2*a* shows a flow chart of a first set of method steps of a computer-implemented method for ground-truth generation of scanned images.
Figure 2B:
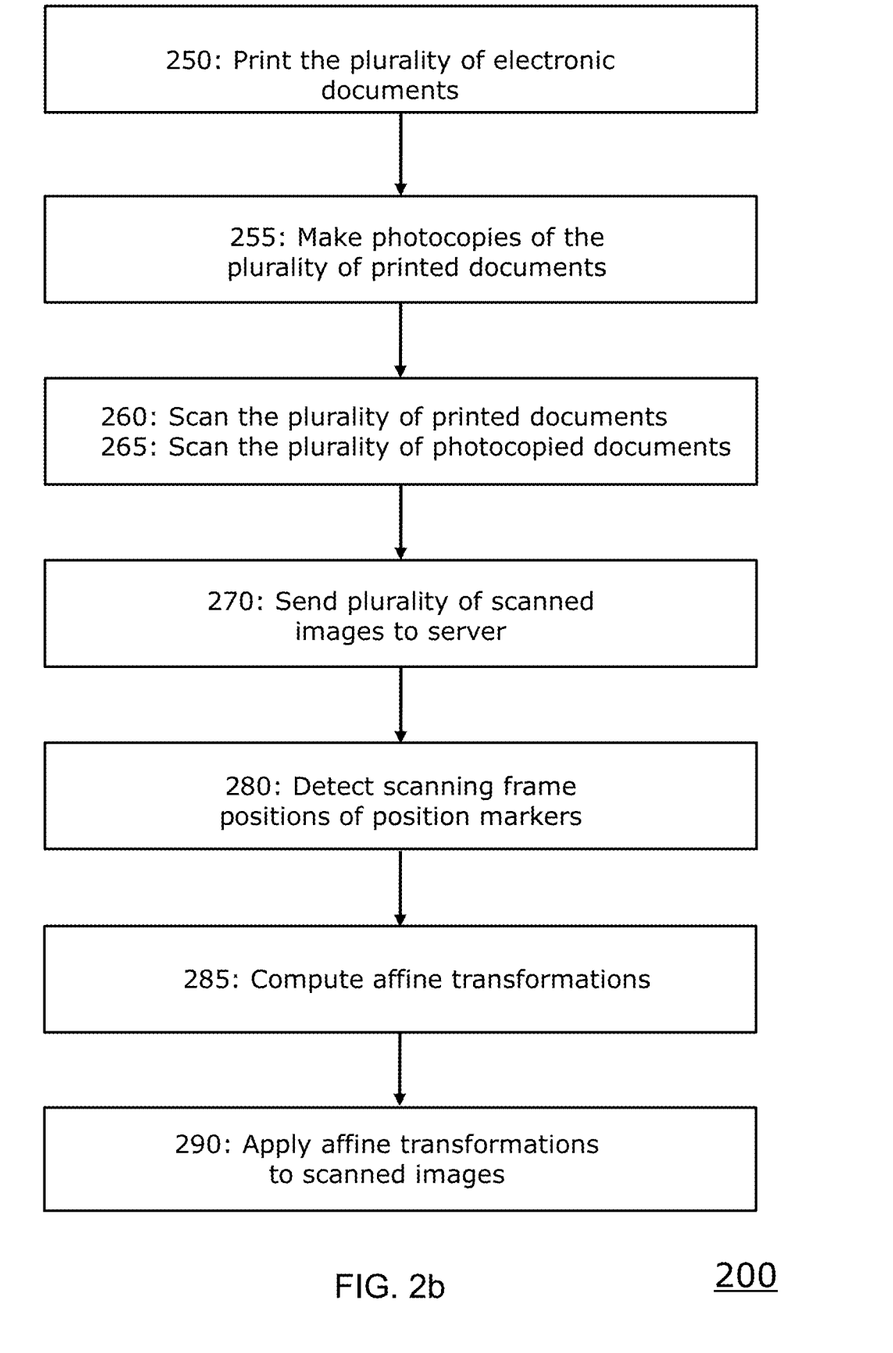
FIG. 2*b* shows a flow chart of a second set of method steps of a computer-implemented method for ground-truth generation of scanned images.

FIG. 2a and FIG. 2b show a flow chart 200 of a computer-implemented method for ground-truth generation of scanned images according to an embodiment of the invention. The method may be performed e.g. by the system 100 of FIG.1 and will hence be described in the following with reference to the components of the system of FIG. 1. The method may be in particular performed under control of the application program 111 that is running on the server 110. Hence the application program 111 may also be denoted as ground-truth generation program.

The method starts at a step 210.

At a step 215, the system 100, in particular the application program 111, receives a plurality of electronic documents. The plurality of electronic documents may each comprise one or more document pages. The plurality of electronic documents may be collected or in other words gathered or assembled from a plurality of different sources. This step may include e.g. crawling public archives, e.g. via the network 140. The electronic documents may be in particular a heterogeneous set of electronic documents. In this respect it is advantageous that the plurality of electronic documents cover many different templates and different industries.

At a step 220, the application program 111 organizes and stores the plurality of electronic documents in the database 112. This step may in particular include to organize the plurality of electronic documents in such a way that a unique page identifier can be assigned to each page of the plurality of electronic documents.

At a step 230, the application program 111 inserts page identifiers to the one or more document pages of the plurality of electronic documents.

At a step 232, the application program 111 inserts first position marker at first positions of the one or more document pages of the plurality of electronic documents.

At a step 234, the application program 111 inserts second position markers at second positions of the one or more document pages of the plurality of electronic documents. The first position markers and the second position markers indicate page position information of the respective page position of the first and the second position markers on the one or more document pages.

The steps 230, 232 and 234 establish preparation steps for subsequent print and scan steps.

At a step 240, the server 110, more particularly the application program 111 running on the server 110, sends a plurality of electronic documents which comprise the first position markers, the second position markers and the page identifiers that have been inserted in the previous steps, via the network 140 to the scanning machine 120.

At a step 250, the scanning machine 120 prints the plurality of electronic documents including the first position markers, the second position markers and the page identifiers. As a result, a printed corpus comprising a plurality of printed documents has been generated.

At a step 255, the scanning machine may make in addition photocopies of the printed corpus comprising the plurality of printed documents. As a result, a photocopied corpus comprising a plurality of photocopied documents has been generated. This increases the noise in the photocopied documents.

At a step 260, the scanning machine 120 scans the plurality of printed electronic documents including the first positions markers, the second position markers and the page identifiers.

At a step 265, the scanning machine 120 scans the plurality of photocopied documents including the first positions markers, the second position markers and the page identifiers.

As a result, a corpus comprising a plurality of scanned images has been generated.

At a step 270, the scanning machine 120 sends automatically via the network 140 the scanned corpus comprising the plurality of scanned images to the server 110. The server 110 may be in particular configured as an ingestion system.

This step 270 may be performed e.g. by sending an e-mail comprising the scanned corpus or by an upload of the scanned corpus to the server 110 via the network 140, e.g. by an upload according to the file transfer protocol (ftp) standard.

At a step 280, the application program 111 of the server 110 detects the scanning frame positions of the first and the second position markers on the plurality of scanned images. The scanning frame positions are the positions or in other words the coordinates of the first and the second position markers with respect to the scanning frame of the plurality of scanned images. The application program may in particular detect the margins or edges of the first and the second position markers, e.g. by optical pattern recognition or optical character recognition (OCR) techniques.

At a step 285, the application program 111 uses the detected scanning frame positions of the first and the second position markers and the page positions of the first and the second position markers to compute and define affine transformations between the plurality of scanned images and the corresponding document pages of the plurality of electronic documents. The affine transformation may comprise in particular a rotation, a translation and/or a rescaling between the original electronic documents and the corresponding scanned images.

The affine transformations may be defined or derived by mathematical methods well known to a skilled person in the art, in particular by linear algebra. Generally an affine transformation may comprise a linear transformation and a translation.

At a step 290, the application program 111 of the server 110 applies the affine transformations to the plurality of scanned images to align the plurality of scanned images with the corresponding document pages of the plurality of electronic documents.

This step 290 may be embodied in particular by applying the affine transformations to bounding boxes of the one or more documents of the plurality of electronic documents. The bounding boxes may be character bounding boxes of the individual characters of the respective electronic document or they may be more global bounding boxes or in other words layout bounding boxes of the layout of the electronic documents such as bounding boxes which demarcate e.g. words, paragraphs, titles or footnotes of the electronic documents.

Subsequently, the generated ground-truth may be used e.g. for machine-learning applications, in particular for optical character recognition (OCR) applications.

Figure 3:
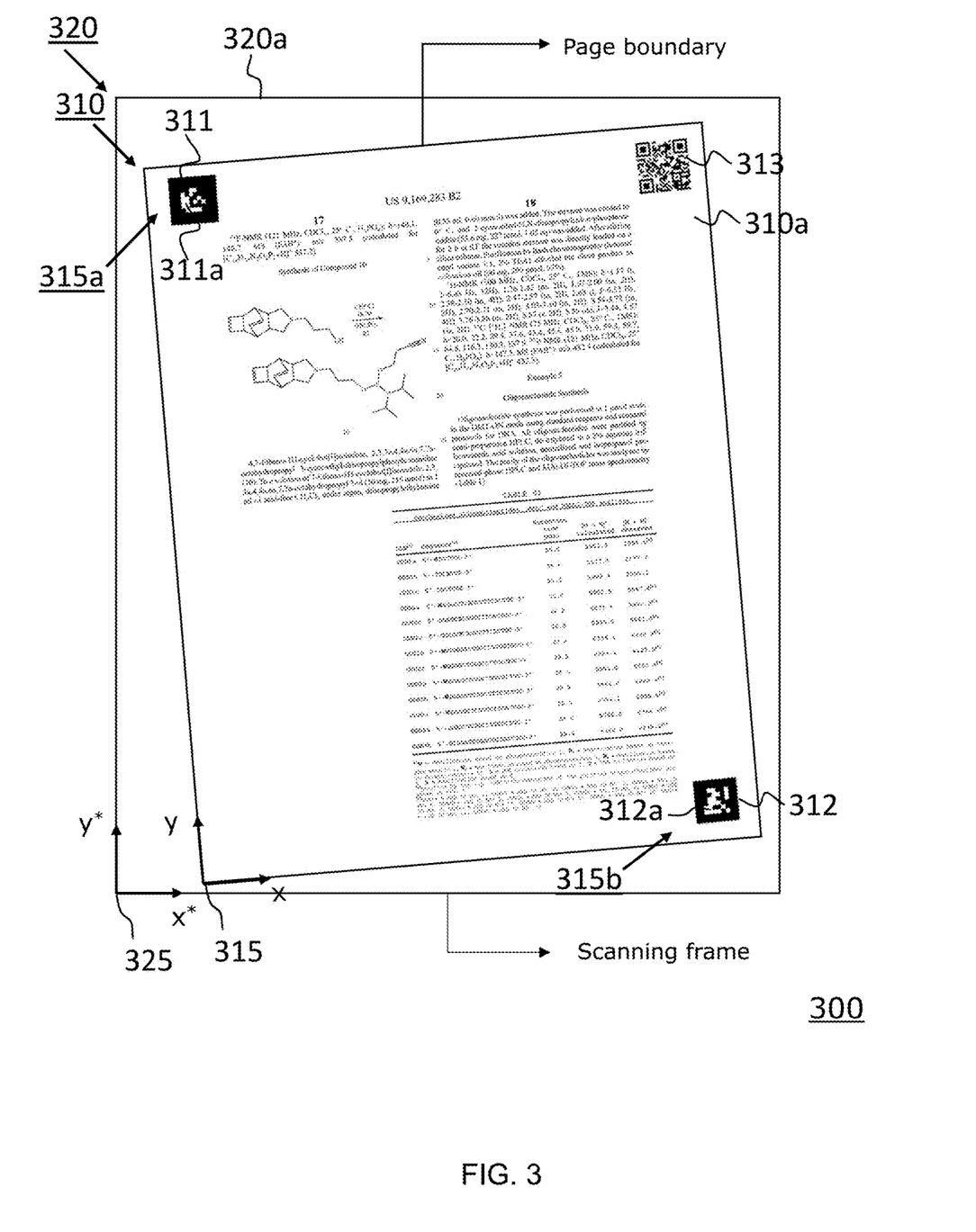
FIG. 3 shows a document page of an electronic document and a corresponding scanned image comprising two position markers and a separate page identifier.

FIG. 3 illustrates aspects of methods for ground truth generation from a scanned image of an electronic document 310. More particularly, FIG. 3 shows a document page 310a of the electronic document 310 and a corresponding scanned image 320. The electronic document 300 may comprise a plurality of document pages, wherein for ease of illustration only the document page 310a is shown.

The document page 310a of the electronic document 310 comprises a first position marker 311, a second position marker 312 and a page identifier 313. The page identifier 313 is according to this embodiment arranged separately from the first position marker 311 and the second position marker 312. The page identifier 313 establishes a unique identifier for the document page 310a which allows a unique identification of the document page 310a. Other not shown document pages of the electronic document 310 or of other electronic documents may comprise also a unique, but different page identifier. According to embodiments, the page identifier 313 may comprise a Quick Response (QR) code to encode the identification information. According to other embodiments, other codes, in particular other visual codes, may be used.

The first position marker 311 and the second position marker 312 comprise encoded position marker information. The encoded position marker information encodes at least information which facilitates a differentiation between the first position marker 311 and the second position marker 312. The position marker information may in particular be encoded by a visual code 311a, 312a. The visual code 311a, 312a of the first position marker 311 and the second position markers 312 may be also embodied as Quick Response (QR) code.

The first position marker 311 and the second position marker 312 are arranged at predefined page positions of a page coordinate system 315 of the document page 310a of the electronic document 310. The page coordinate system 315 comprises a x-axis and a y-axis which have its origin according to the illustrated embodiment in the lower left corner. The first position marker 311 is arranged in a first corner area of the document page 310a and the second position marker is arranged in a second corner area of the document page 310a. More particularly, the first position marker 311 is arranged in a top left corner area 315a and the second position marker 312 as arranged in a lower right corner area 315b of the document page 310a.

According to embodiments, all document pages of the electronic document 310 as well as of other electronic documents used for the ground truth generation may comprise the same first position markers and the same second position markers and these position markers may be arranged at the same positions on all the document pages of all the electronic documents.

The scanned image 320 of the document page 310a comprises a scanning frame coordinate system 325 or in other words a scanned image coordinate system 325. The scanning frame coordinate system 325 comprises a x*-axis and a y*-axis which have its origin according to the illustrated embodiment in the lower left corner of the scanning frame 320a of the scanned image 320.

Methods according to embodiments of the invention detect, e.g. at the step 280 shown in FIG. 2, the scanning frame positions of the first position marker 311 and the second position marker 312 on the scanned image 320. The scanning frame positions are the coordinates of the first position marker 311 and the second position marker 312 with respect to the scanning frame 320a or more particularly with respect to the scanned image coordinate system 325 comprising the x*-axis and the y*-axis. The application program 111 may in particular detect the margins/edges of the first position marker 311 and the second position marker 312, e.g. by optical pattern recognition methods as known in the art.

Methods according to embodiments of the invention use then the detected scanning frame positions of the first position marker 311 and the second position marker 312, i.e. the position of the respective markers in the x*-y*-coordinate system and the page positions of the first position marker 311 and the second position marker 312, i.e. the position of the respective markers in the original x-y-coordinate system to compute and define the corresponding affine transformation between the scanned image 320 and the corresponding document page 310a. The affine transformations comprise in particular a coordinate transformation. The affine transformations may be defined or derived by mathematical methods well known to a skilled person in the art, in particular by linear algebraic methods.

The computed and defined affine transformations may then be applied to the scanned image 320 to align the scanned image 320 with the corresponding document page 310a.

While affine transformations comprising a translation and a rotation may be derived from two position markers, more complex transformations such as skewing may be facilitated with additional position markers.

Accordingly, methods according to further embodiments of the invention may comprise an additional step of inserting third position markers at third positions of the one or more document pages of the plurality of electronic documents. Further embodied methods may comprise another step of inserting fourth position markers at fourth positions of the one or more document pages of the plurality of electronic documents.

Figure 4:
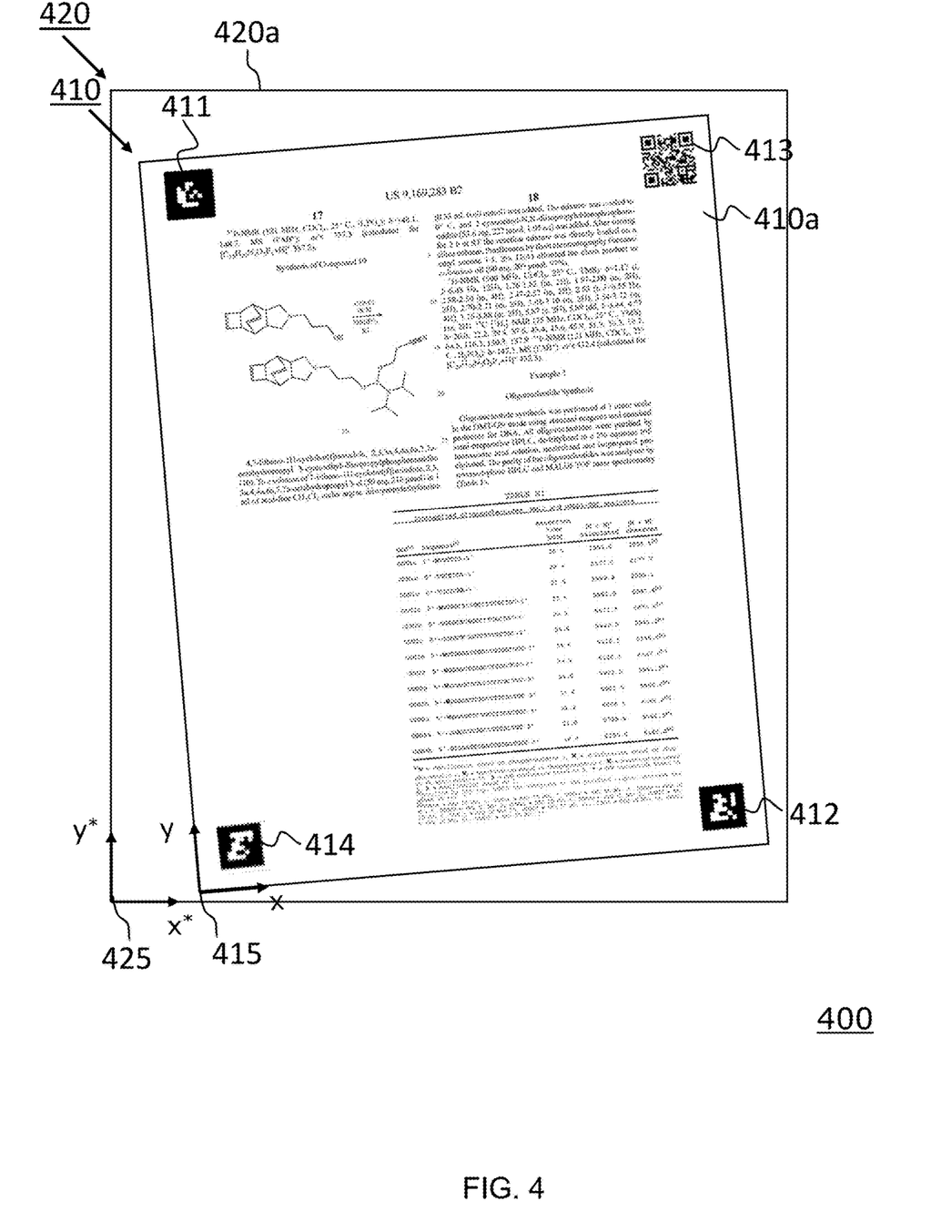
FIG. 4 shows a document page of an electronic document and a corresponding scanned image comprising 3 position markers and a separate page identifier.

FIG. 4 shows a document page 410a of an electronic document 410 and a corresponding scanned image 420 comprising 3 position markers. More particularly, the document page 410a of the electronic document 410 comprises a first position marker 411, a second position marker 412, a third position marker 414 and a page identifier 413. The page identifier 413 is according to this embodiment also arranged separately from the first position marker 411, the second position marker 412 and the third position marker 414. The three position markers 411, 412 and 414 facilitate to compute and define more complex affine transformations between the original electronic documents and the scanned images, in particular skewing.

Figure 5:
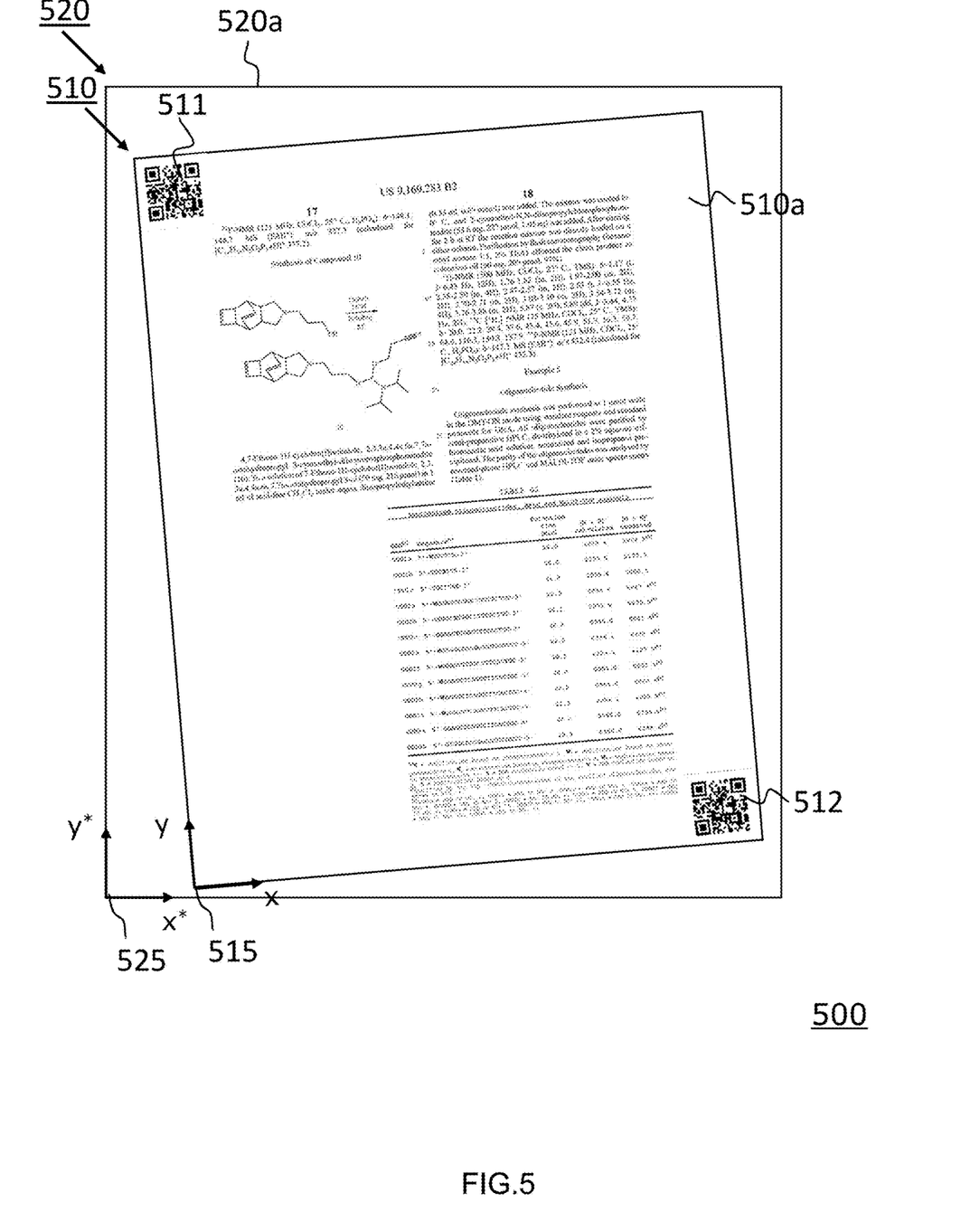
FIG. 5 shows a document page of an electronic document and a corresponding scanned image comprising two position markers with an integrated page identifier.

FIG. 5 shows a document page 510a of an electronic document 510 and a corresponding scanned image 520 comprising position markers with integrated page identifiers. More particularly, the document page 510a of the electronic document 510 comprises a first position marker 511 and a second position marker 512. The page identifier is according to this embodiment integrated into the first position marker 511 and the second position marker 512. The first position marker 511 and the second position marker 512 fulfill a two-fold need. On the one hand they comprise a QR code containing the unique page identifier of the document page in order to link it to the original document. On the other, the position of first position marker 511 and the second position marker 512 is used to find the correct affinity transformation to align the scanned image with the original electronic document. Furthermore, the QR code encodes some information that allows to differentiate between the first position marker 511 and the second position marker 512.

Figure 6:
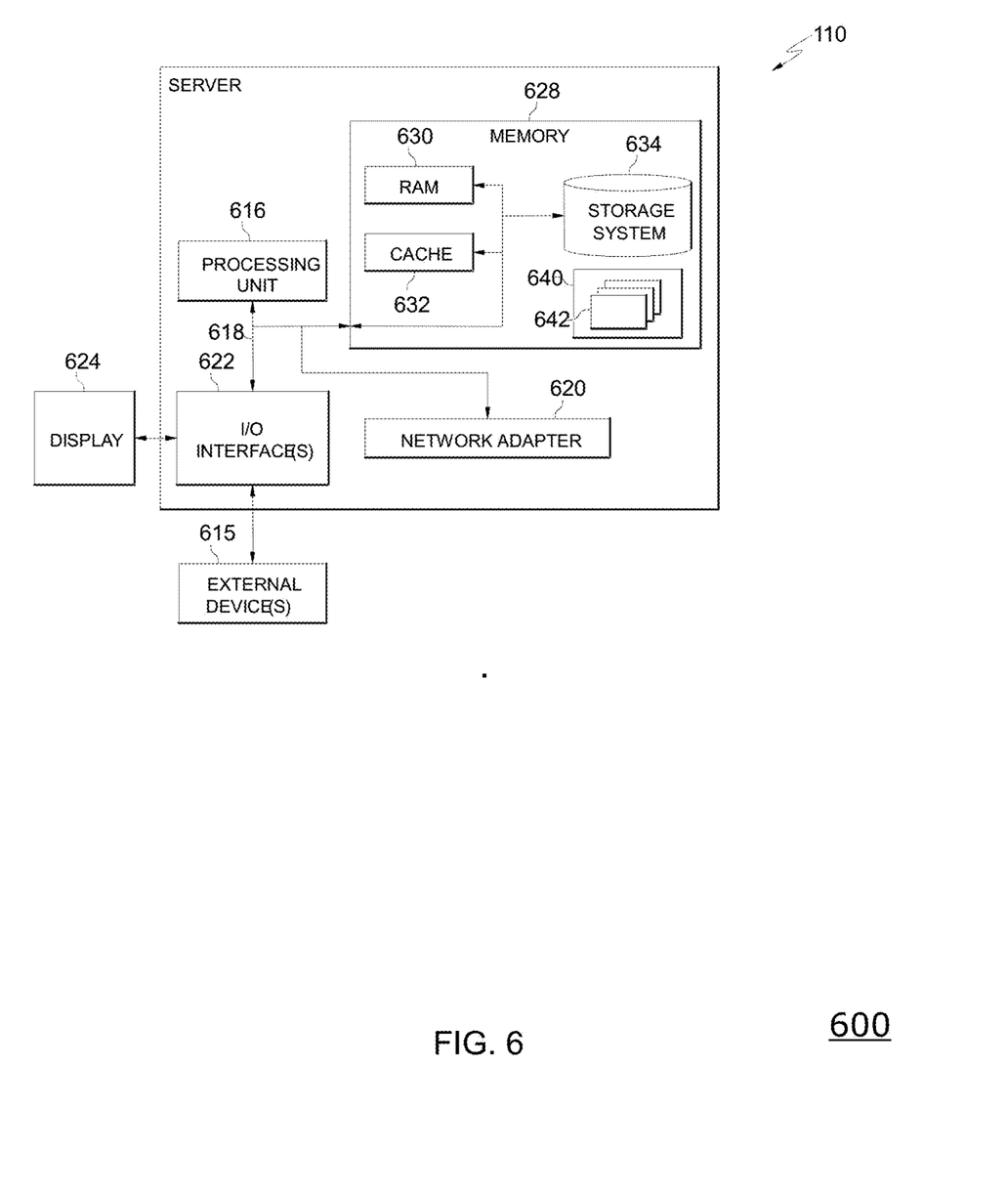
FIG. 6 shows a more detailed block diagram of a server according to an embodiment of the invention.

Referring now to FIG. 6, a more detailed embodiment of the server 110 is illustrated. The server 110 may be operational with numerous other general purpose or special purpose computing system environments or configurations. Examples of well-known computing systems, environments, and/or configurations that may be suitable for use with server 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular the server 110 is operational with the scanning machine 120 of the system 100 and a user device 130 of the system 100 as shown in FIG. 1.

The server 110 may be described in the general context of computer system-executable instructions, such as program modules, being executed by a computer system. Generally, program modules may include routines, programs, objects, components, logic, data structures, and so on that perform particular tasks or implement particular abstract data types. The server 110 is shown in the form of a general-purpose computing device. The components of server 110 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 110 typically includes a variety of computer system readable media. Such media may be any available media that is accessible by server 110, and it includes both volatile and non-volatile media, removable and non-removable media.

System memory 628 can include computer system readable media in the form of volatile memory, such as random access memory (RAM) 630 and/or cache memory 632. Server 110 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Program modules 642 may carry out in particular one or more steps of computer-implemented methods for ground-truth generation of electronic documents according to embodiments of the invention, e.g. one or more steps of the method as described with reference to FIGS. 2*a* and 2*b*. Program modules 642 may encompass in particular the application program 111 as described with reference to FIG. 1.

Server 110 may also communicate with one or more external devices 615 such as a keyboard, a pointing device, a display 624, etc.; one or more devices that enable a user to interact with server 110; and/or any devices (e.g., network card, modem, etc.) that enable server 110 to communicate with one or more other computing devices. Such communication can occur via Input/Output (I/O) interfaces 622. Still yet, server 110 can communicate with one or more networks such as a local area network (LAN), a general wide area network (WAN), and/or a public network (e.g., the Internet) via network adapter 620. As depicted, network adapter 620 communicates with the other components of server 110 via bus 618. It should be understood that although not shown, other hardware and/or software components could be used in conjunction with server 110. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor/processing unit of the server 110 and/or the user device 130 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for ground-truth generation of scanned images, the method comprising
    receiving a plurality of electronic documents, the plurality of electronic documents comprising one or more document pages;
    inserting first position markers at first positions of the one or more document pages of the plurality of electronic documents;
    inserting second position markers at second positions of the one or more document pages of the plurality of electronic documents, wherein the first position markers and the second position markers indicate page position information of the respective page position of the first and the second position markers on the one or more document pages;
    inserting page identifiers to the one or more document pages of the plurality of electronic documents;
    printing the plurality of electronic documents including the first position markers, the second position markers and the page identifiers, thereby generating a printed corpus comprising a plurality of printed documents;
    scanning the plurality of printed documents including the first positions markers, the second position markers and the page identifiers, thereby generating a scanned corpus comprising a plurality of scanned images;
    detecting scanning frame positions of the first and the second position markers on the plurality of scanned images, wherein the scanning frame positions are the positions of the first and the second position markers with respect to the scanning frame of the plurality of scanned images;
    using the detected scanning frame positions of the first and the second position markers and the page positions of the first and the second position markers to define affine transformations between the plurality of scanned images and the corresponding document pages of the plurality of electronic documents; and
    applying the affine transformations to the plurality of scanned images to align the plurality of scanned images with the corresponding document pages of the plurality of electronic documents.

2. The computer-implemented method according to claim 1, wherein the page identifiers are arranged separately from the first position markers and the second position markers.

3. The computer-implemented method according to claim 1, wherein the page identifiers are integrated into the first position markers and/or the second position markers.

4. The computer-implemented method according to claim 1, further comprising
    organizing the plurality of electronic documents in a database such that a unique page identifier can be assigned to each document page of the plurality of electronic documents.

5. The computer-implemented method according to claim 1, wherein the first position markers and the second position markers comprise a Quick Response (QR) code.

6. The computer-implemented method according to claim 1, wherein the page identifiers comprise a Quick Response (QR) code.

7. The computer-implemented method according to claim 1, wherein the first position markers are arranged in a first corner area of the one or more document pages and the second position markers are arranged in a second corner area of the one or more document pages.

8. The computer-implemented method according to claim 1, further comprising
    inserting third position markers at third positions of the one or more document pages of the plurality of electronic documents.

9. The computer-implemented method according to claim 8, further comprising
    inserting fourth position markers at fourth positions of the one or more document pages of the plurality of electronic documents.

10. The computer-implemented method according to claim 1, further comprising
  making photocopies of the printed corpus comprising the plurality of printed documents to increase the noise of the plurality of printed documents, thereby generating a photocopied corpus comprising a plurality of photocopied documents; and
  scanning the plurality of photocopied documents including the first positions markers, the second position markers and the page identifiers.

11. The computer-implemented method according to claim 1, further comprising
  sending, by a scanning machine, automatically the corpus comprising the plurality of scanned images to an ingestion system.

12. The computer-implemented method according to claim 1, further comprising applying the affine transformations to bounding boxes of the one or more documents of the plurality of electronic documents.

13. The computer-implemented method according to claim 1, wherein the first position markers and the second position markers are arranged at predefined page positions of a page coordinate system of the document pages of the electronic document.

14. The computer-implemented method according to claim 1, wherein the first position markers and the second position markers comprise encoded position marker information adapted to facilitate a differentiation between the first position marker and the second position marker.

15. A system for performing a computer-implemented method for ground-truth generation of scanned images, the system comprising a server, a scanning machine and a network, the system being configured to:
  receive, by the server, a plurality of electronic documents, the plurality of electronic documents comprising one or more document pages;
  insert, by the server, first position markers at first positions of the one or more document pages of the plurality of electronic documents;
  insert, by the server, second position markers at second positions of the one or more document pages of the plurality of electronic documents, wherein the first position markers and the second position markers indicate page position information of the respective page position of the first and the second position markers on the one or more document pages;
  insert, by the server, page identifiers to the one or more document pages of the plurality of electronic documents;
  print, by the scanning machine, the plurality of electronic documents including the first position markers, the second position markers and the page identifiers, thereby generating a printed corpus comprising a plurality of printed documents;
  scan, by the scanning machine, the plurality of printed documents including the first positions markers, the second position markers and the page identifiers, thereby generating a scanned corpus comprising a plurality of scanned images;
  detect, by the server, scanning frame positions of the first and the second position markers on the plurality of scanned images, wherein the scanning frame positions are the positions of the first and the second position markers with respect to the scanning frame of the plurality of scanned images;
  use, by the server, the detected scanning frame positions of the first and the second position markers and the page positions of the first and the second position markers to compute affine transformations between the plurality of scanned images and the corresponding document pages of the plurality of electronic documents; and
  apply by the server, the affine transformations to the plurality of scanned images to align the plurality of scanned images with the corresponding document pages of the plurality of electronic documents.

16. A computer program product for ground-truth generation of scanned images by a system comprising a scanning machine, a server, and a network, the computer program product comprising a computer readable storage medium having program instructions embodied therewith, the program instructions executable by the system to cause the system to perform a method comprising:
  receiving a plurality of electronic documents, the plurality of electronic documents comprising one or more document pages;
  inserting first position markers at first positions of the one or more document pages of the plurality of electronic documents;
  inserting second position markers at second positions of the one or more document pages of the plurality of electronic documents, wherein the first position markers and the second position markers indicate page position information of the respective page position of the first and the second position markers on the one or more document pages;
  inserting page identifiers to the one or more document pages of the plurality of electronic documents;
  printing the plurality of electronic documents including the first position markers, the second position markers and the page identifiers, thereby generating a printed corpus comprising a plurality of printed documents;
  scanning the plurality of printed documents including the first positions markers, the second position markers and the page identifiers, thereby generating a scanned corpus comprising a plurality of scanned images;
  detecting scanning frame positions of the first and the second position markers on the plurality of scanned images, wherein the scanning frame positions are the positions of the first and the second position markers with respect to the scanning frame of the plurality of scanned images;
  using the detected scanning frame positions of the first and the second position markers and the page positions of the first and the second position markers to define affine transformations between the plurality of scanned images and the corresponding document pages of the plurality of electronic documents; and
  applying the affine transformations to the plurality of scanned images to align the plurality of scanned images with the corresponding document pages of the plurality of electronic documents.

* * * * *